(12) United States Patent
Tyler et al.

US010650653B2

(10) Patent No.: US 10,650,653 B2
(45) Date of Patent: May 12, 2020

(54) LOCATION TRACKING USING BEACONS

(71) Applicant: United Parcel Service of America, Inc., Atlanta, GA (US)

(72) Inventors: Daniel Paul Tyler, Louisville, KY (US); Balakrishna Subramaniam, Prospect, KY (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 0 days.

(21) Appl. No.: 15/655,406

(22) Filed: Jul. 20, 2017

(65) Prior Publication Data

US 2018/0025603 A1 Jan. 25, 2018

Related U.S. Application Data

(60) Provisional application No. 62/364,402, filed on Jul. 20, 2016.

(51) Int. Cl.
*G08B 13/24* (2006.01)
*G01S 5/00* (2006.01)
(Continued)

(52) U.S. Cl.
CPC .......... *G08B 13/2462* (2013.01); *G01S 5/00* (2013.01); *G01S 5/0257* (2013.01); *G01S 19/48* (2013.01);
(Continued)

(58) Field of Classification Search
CPC .. G08B 13/2462; G06Q 10/08; G06Q 10/083; G06Q 10/0833; G06Q 50/28;
(Continued)

(56) References Cited

U.S. PATENT DOCUMENTS

| 5,532,521 A | 7/1996 | Leininger |
| 7,272,172 B2 | 9/2007 | Olsen, III et al. |

(Continued)

FOREIGN PATENT DOCUMENTS

| EP | 1182154 A1 | 2/2002 |
| JP | 1214504 A | 11/1989 |

OTHER PUBLICATIONS

ISA/206—Invitation to Pay Additional Fees dated Oct. 25, 2017 for WO Application No. PCT/US17/042993, dated Oct. 25, 2017.
(Continued)

*Primary Examiner* — Adnan Aziz
(74) *Attorney, Agent, or Firm* — Shook, Hardy & Bacon L.L.P.

(57) ABSTRACT

Systems and methods for tracking the location of an asset may utilize wireless asset beacons broadcasting asset information/data and powered asset beacons secured relative to movable powered assets. The powered asset beacons may be configured to receive signals transmitted from the asset beacons and to ascertain a relative location between the asset beacon and the powered asset to determine an estimated location of the asset. Moreover, the asset beacons may be selectively activated based on the occurrence of a trigger event, such that the asset beacons do not wireless transmit information/data when it is desirable to limit wireless data transmissions.

15 Claims, 8 Drawing Sheets

(51) Int. Cl.
*G01S 19/48* (2010.01)
*G01S 5/02* (2010.01)
*H04W 52/02* (2009.01)
*G06Q 50/28* (2012.01)
*G06Q 10/08* (2012.01)

(52) U.S. Cl.
CPC ......... *G06Q 10/0833* (2013.01); *G06Q 50/28* (2013.01); *H04W 52/0212* (2013.01)

(58) Field of Classification Search
CPC .......... G01S 5/00; G01S 5/0257; G01S 19/48; H04W 52/0212
See application file for complete search history.

(56) References Cited

U.S. PATENT DOCUMENTS

| | | | |
|---|---|---|---|
| 7,974,637 B1* | 7/2011 | Taveniku | G06Q 10/0833 455/456.1 |
| 9,020,527 B2 | 4/2015 | Lee et al. | |
| 9,064,225 B2 | 6/2015 | Nakra et al. | |
| 9,658,310 B2 | 5/2017 | Loverich et al. | |
| 2003/0003777 A1 | 1/2003 | Lesesky et al. | |
| 2003/0060938 A1 | 3/2003 | Duvall | |
| 2003/0120522 A1 | 6/2003 | Uyeki | |
| 2003/0190911 A1 | 10/2003 | Hirano | |
| 2003/0204407 A1 | 10/2003 | Nabors et al. | |
| 2004/0055345 A1 | 3/2004 | Moore | |
| 2004/0102896 A1 | 5/2004 | Thayer et al. | |
| 2005/0209947 A1 | 9/2005 | Shafer | |
| 2006/0023679 A1* | 2/2006 | Twitchell | H04Q 9/00 370/338 |
| 2009/0160646 A1* | 6/2009 | MacKenzie | G06Q 10/08 340/572.1 |
| 2011/0148625 A1 | 6/2011 | Velusamy | |
| 2011/0227722 A1 | 9/2011 | Salvat, Jr. | |
| 2011/0291803 A1* | 12/2011 | Bajic | G08B 13/2462 340/10.1 |
| 2013/0063251 A1 | 3/2013 | Allen | |
| 2013/0300544 A1* | 11/2013 | Kamel | G06K 17/00 340/10.5 |
| 2013/0324151 A1* | 12/2013 | Lee | H04W 24/00 455/456.1 |
| 2014/0018001 A1* | 1/2014 | Nakra | G06Q 10/0833 455/41.2 |
| 2014/0184804 A1* | 7/2014 | Lee | G06Q 10/0833 348/159 |
| 2015/0234051 A1* | 8/2015 | Moshfeghi | G01S 19/07 342/357.43 |
| 2016/0257415 A1* | 9/2016 | Ye | B64D 3/00 |
| 2017/0019765 A1* | 1/2017 | Hoyer | H04B 5/0075 |
| 2017/0355470 A1* | 12/2017 | Keller | F21S 41/657 |
| 2018/0175630 A1* | 6/2018 | Lilly | H02J 5/005 |

OTHER PUBLICATIONS

ISA/220—Notification of Transmittal or Search Report and Written Opinion of the ISA, or the Declaration dated Dec. 19, 2017 for WO Application No. PCT/US17/042993.
We Make Electronic Sealing Easy and Economical, All Set Wireless Tracking, Copyright 2003, Staff, All Set, 2 pages, http://www.allset.se/tracking/solutions/products.asp., Feb. 17, 2004.
Warehouse Operations Committee (Agenda), IARW, Jul. 27, 2003, 44 Pages.
U.S. Treasury Advisory Committee on Commercial Operations of the United States Customs Service (COAC) Subcommittee on US Border Security Technical Advisory Group & Customs Trade Partnership Against Terrorism (C-TPAT), Report on Seal Technologies, Report on Seal Technologies, Jun. 14, 2002, Scott Smith, Harrison Consulting Group, LLC, National Cargo Security Council, 37 pages, vol. 7.
Solutions, Elogicity, Accessed Feb. 17, 2004, p. 1, http//www.elogicity.com/solutions.htm.
Secured Cargo, Staff, Hi-G-Tek, 4 pages, http://www.higtek.com/cargo.htm, Feb. 17, 2004.
Savi Technology Launches SmartSeal (Trademark) Cargo Security System, Copyright 2002, Savi Technology, 2 pages, http://www.savi.com/news_events/2001releases/oct03-01.html, Feb. 17, 2004.
Savi Solutions, Copyright 2002, Staff, Savi Technology, 1 page, http://www.savi.com/solutions/index.html, Feb. 17, 2004.
Savi Search, Copyright 2002, Staff, Savi Technology, 2 pages, http://www.savi.com/cgi-bin/sitesearch/search_savi.cgi, Feb. 17, 2004.
Our Products, CGM Security Solutions, Accessed Feb. 17, 2004, pp. 4, http//www.cgmsecuritysolution.com/sw/swchannel/productcalalogcf v2/internet/Product . . . .
Our Business, Elogicity, Accessed Feb. 17, 2004, p. 1, http//www.elogicity.com/about us.htm.
Keep Track of Your Containers, All Set Wireless Tracking, Copyright 2003, Staff, All Set, 3 pages, http://www.allset.se/tracking/solutions/scenarios.asp, Feb. 17, 2004.
Insecurity Over E-Seals, Jan. 19, 2004, Kathleen Hickey, Traffic World, p. 34.
Hi-G-Tek Diamond are Forever, Hi-G-Tek, Accessed Feb. 17, 2004, p. 1, http//www.higtek.com/images/article.gif.
Freight Containers—Radio-Frequency Communication Protocol for Electronic Seal, Working Document ISO/TC 104SC 4 N XXX, Sep. 27, 2003, ISO Committee ISO/TC 104/SC4, ISO Central Secretariat, 23 pages, ISO/DIS 18185.
Elementary Solutions for a Moving World, All Set Wireless Tracking, Copyright 2003, Staff, All Set, 1 page, http://www.allset.se/tracking/, Feb. 17, 2004.
CIMC and All Set in "Smart and Secure Container" Alliance, All Set Wireless Tracking, Apr. 4, 2003, Staff, All Set, 2 pages, http://www.allset.se/tracking/news/Articles/default.asp?articleID=16, Feb. 17, 2004.
Cargo Security Your Source for Supply Chain Cargo Security Products, CGM Security Solutions, Accessed Feb. 17, 2004, pp. 2, http://www.cgmsecuritysolutions.com/sw/swchannel/homepage/internet/schomenage.asp?. . . .
Cargo Container With Smart Systems Alerts Global Network in Real Time About Security Breaches and In-the-Box Changes, News/Events: Press Releases, Oct. 29, 2003, Staff, All Set, 4 pages, http://www.savi.com/news_events/2003releases/oct29-03.a.html, Feb. 17, 2004.
All Set Tracking Launches a New Revolutionary Electronic Seal, All Set Marine Security, Sep. 17, 2002, Staff, All Set, 1 page, http://www.allset.se/security /news/Articles/default.asp?articleID= 14, Oct. 14, 2004.
All Set System Installed Onboard RoRo Ship, All Set Wireless Tracking, May 26, 2003, Staff, All Set, 1 page, http://www.allset.se/tracking/news/Articles/default.asp?articleID=19.
About Hi-G-Tek, Staff, Hi-G-Tek, 2 pages, http://www.higtek.com/company.htm, Feb. 17, 2004.
A Truly Global Tracking System with True Security, All Set Wireless Tracking, Copyright 2003, All Set, 1 page, http://www.allset.se/tracking/solutions.overview.asp, Feb. 17, 2004.

* cited by examiner

LOCATION TRACKING USING BEACONS

CROSS-REFERENCE TO RELATED APPLICATIONS

This application claims priority to U.S. Provisional Application No. 62/364,402 filed Jul. 20, 2016 which is hereby incorporated herein in its entirety by reference.

BACKGROUND

Current automated item tracking mechanisms often utilize wireless data transmission protocols to identify the location and/or identity of various items to be tracked. Without those wireless data transmissions, the automated item tracking mechanisms are unable to identify the location of items without some human interaction. This limitation becomes particularly acute in instances in which wireless data transmissions are undesirable, which severely limits the functionality of tracking mechanisms. Users of the tracking systems may be required to manually disable wireless data transmissions in certain instances, thereby temporarily disabling the automated tracking mechanism until wireless data transmissions are acceptable once again. However, human error often results in such wireless data transmission mechanisms being inappropriately left in an active state when such wireless transmissions are undesirable, and/or such wireless data transmission mechanisms being inappropriately left in an inactive state when wireless transmissions are once again acceptable for item tracking.

Accordingly, a need exists for automated item tracking mechanisms configured to automatically disable and/or enable wireless data transmissions to maximize the effectiveness of wireless item tracking mechanisms.

BRIEF SUMMARY

Various embodiments are directed to systems and methods for tracking the location of containers and/or other assets via a plurality of beacons that may be configurable between a plurality of operating modes including an advertising mode, a listening mode, and a sleep mode. The various operating modes enables the beacons to be utilized in environments in which constant transmission of advertising data is not desirable (e.g., on aircraft), while enabling automatic location of the containers and/or assets during periods of time in which wireless data transmission is desirable.

In certain embodiments, a system for monitoring the location of one or more assets may comprise: one or more status sensors; one or more wireless network interfaces; and one or more processors configured to: monitor the one or more status sensors to determine the occurrence of one or more trigger states; upon detecting that a trigger state is not present, configure the one or more network interfaces into a listening mode, wherein the one or more wireless network interfaces are configured to receive wireless signals broadcast by third party computing entities while in the listening mode; upon detecting that one or more wireless signals are received by the wireless network interfaces, configuring the one or more wireless network interfaces into an advertising mode, wherein the one or more wireless network interfaces are configured to broadcast one or more signals while in the advertising mode; and upon detecting that a trigger state is present, configure the one or more network interfaces into a sleep mode.

Moreover, in certain embodiments, a method for monitoring the location of one or more assets may comprise steps for: providing one or more wireless beacons on each of the one or more assets, wherein each of the one or more wireless beacons comprise one or more status sensors and one or more wireless network interfaces; monitoring the one or more status sensors to determine the occurrence of one or more trigger states; upon detecting that a trigger state is not present, configuring the one or more network interfaces into a listening mode, wherein the one or more wireless network interfaces are configured to receive wireless signals broadcast by third party computing entities while in the listening mode; upon detecting that one or more wireless network interfaces are received by the wireless network interfaces, configuring the one or more wireless network interfaces into an advertising mode, wherein the one or more wireless network interfaces are configured to broadcast one or more signals while in the advertising mode; and upon detecting that a trigger state is present, configuring the one or more network interfaces into a sleep mode.

In certain embodiments, a system for monitoring the location of one or more assets may comprise: a location determining device secured to a powered asset, the location determining device configured to detect a location and heading of the powered asset; at least one powered asset beacon secured to the powered asset, wherein the at least one powered asset beacon is configured to detect signals transmitted from one or more asset beacons secured to one or more assets while the asset beacons are positioned within a transmission range of the powered asset beacon; at least one camera secured relative to the powered asset and having a known orientation relative to the powered asset; and a controller configured to: detect at least one signal emitted from an asset beacon secured relative to an asset; detect the asset within an image captured by the at least one camera; and determine the location of the asset based at least in part on the location and the heading of the powered asset and a signal strength of the signal emitted from the asset beacon.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DESCRIPTION

Figure 1:
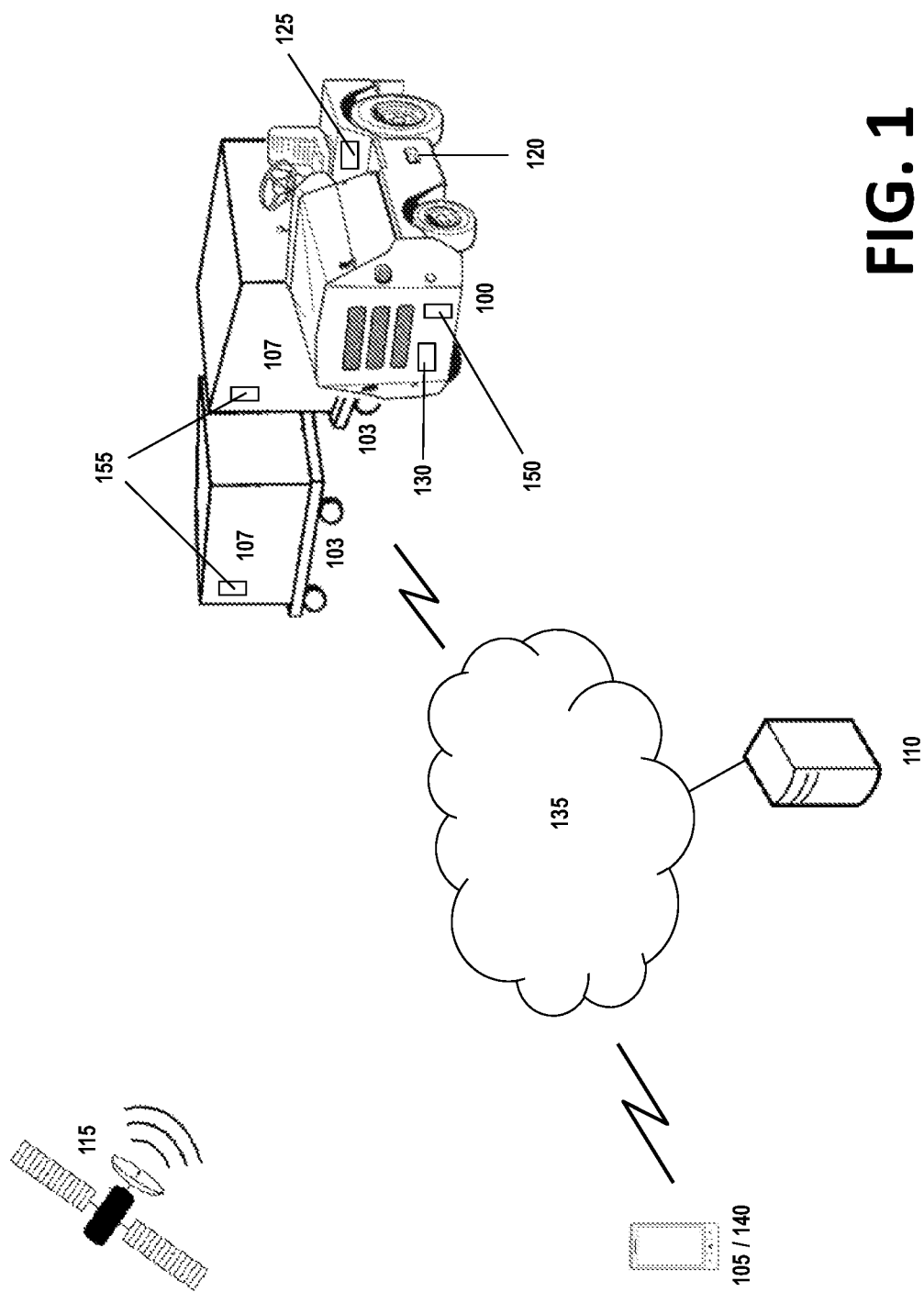
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a system that can be used in conjunction with various embodiments of the present invention. As shown in FIG. 1, the system may include one or more powered assets 100, one or more non-powered assets 103, one or more containers 107, one or more items 109 (not shown), one or more mobile computing entities 105, one or more tracking computing entities 110, one or more Global Positioning System (GPS) satellites 115, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, stand-alone entities, the various embodiments are not limited to this particular architecture.

a. Exemplary Powered Asset

In various embodiments, the term powered asset 100 is used generically. For example, a powered asset 100 may be a tug, tractor, truck, car, van, flatbed, vehicle, aircraft-pushback tractor, cargo loader, forklift, and/or the like. As will be recognized, in many cases, a powered asset 100 may be configured to push, pull, lift, or otherwise move a non-powered asset 103. Further, each powered asset 100 may be associated with a unique powered asset identifier (such as a powered asset ID) that uniquely identifies the powered asset 100. The unique powered asset ID may include characters, such as numbers, letters, symbols, and/or the like. For example, an alphanumeric powered asset ID (e.g., "AS445") may be associated with each powered asset 100. In another embodiment, the unique powered asset ID may be a registration number or other identifying information/data assigned to the powered asset 100.

Figure 2:
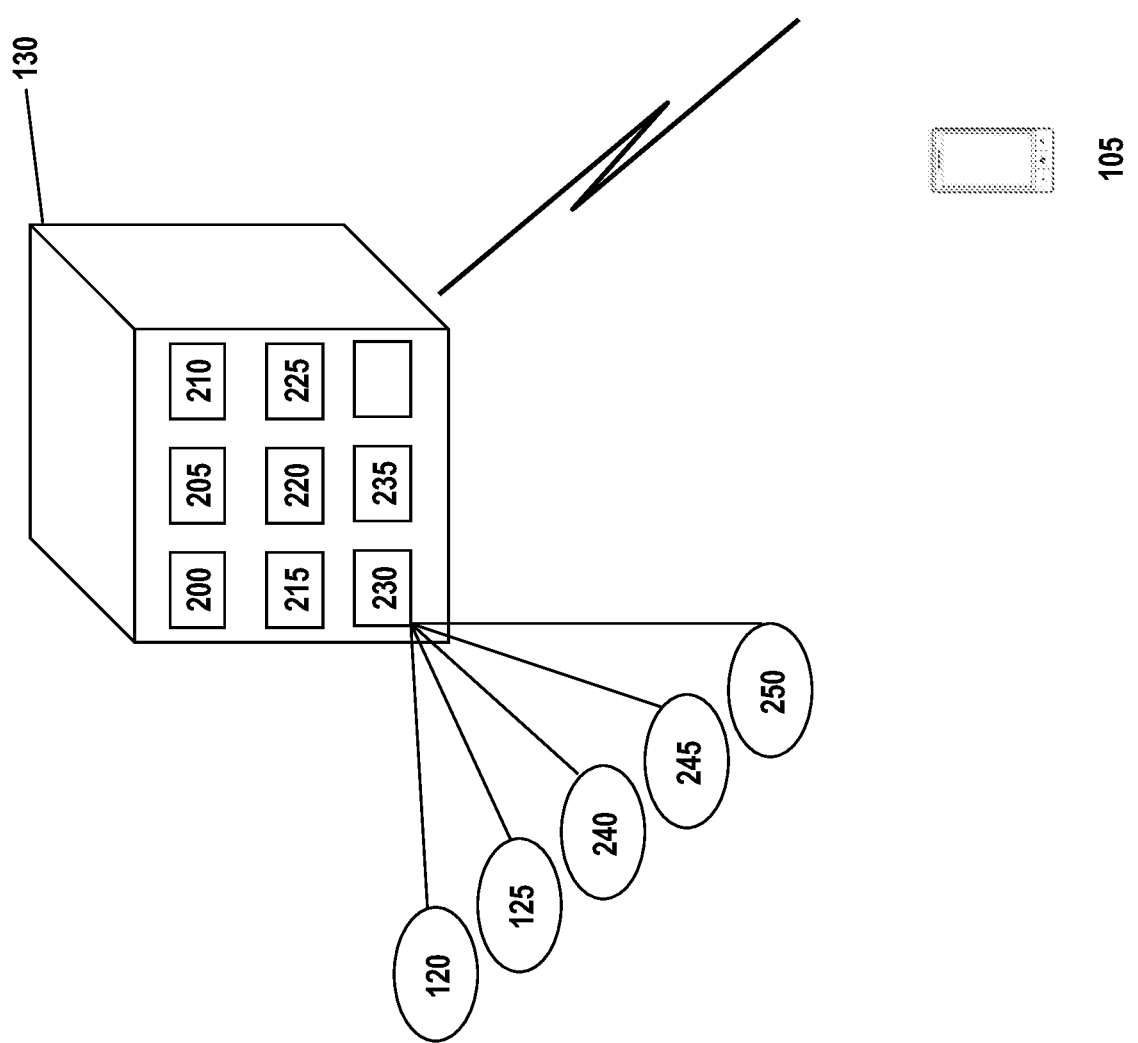
FIG. 2 is a diagram of an information/data collection device that may be used in association with certain embodiments of the present invention.

FIG. 1 shows one or more computing entities, devices, and/or similar words used herein interchangeably that are associated with the powered asset 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, watches, glasses, beacons, key fobs, radio frequency identification (RFID) tags, ear pieces, scanners, televisions, dongles, cameras, wristbands, wearable items/devices, items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a powered asset 100. The information/data collection device 130 may collect telematics information/data (including location data) and transmit/send the information/data to the mobile computing entity 105, the tracking computing entity 110, and/or various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the powered asset 100 but external to the information/data collection device 130. Thus, each of the components may be referred to individually or collectively as a powered asset computing entity.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors 120 may be compatible with Assisted GPS (A-GPS) for quick time to first fix and jump starting the ability of the location sensors 120 to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular powered asset and/or the powered asset's operator and with various communication points (e.g., cellular towers or Wi-Fi access points) positioned at various locations throughout a geographic area to monitor the location of the powered asset 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with the tracking computing entity 110, the information/data collection device 130, mobile computing entity 105, and/or similar computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include powered asset sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide (H₂S) and/or ammonium (NH₄) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and/or digital inputs from powered asset systems and sensors. The ECM 245 may further have information/data processing capability to collect and present telematics information/data to the J-Bus (which may allow transmission to the information/data collection device 130), and output standard powered asset diagnostic codes when received from a powered asset's J-Bus-compatible on-board controllers 240 and/or sensors.

Additionally, each powered asset 100 may have one or more powered asset beacons 150 attached or affixed thereto. As will be recognized, a beacon may take many forms. For instance, a beacon may be a Bluetooth Low Energy (BLE) beacon (e.g., a URIBeacon, an AltBeacon, or an iBeacon), an RFID tag/sensor, a near field communication (NFC) device, a Wi-Fi device, and/or the like. The powered asset beacons 150 may include some or all of the following components: one or more input interfaces for receiving information/data, one or more output interfaces for transmitting information/data, a processor, a clock, memory modules, one or more sensors for sensing and detecting various information/data (e.g., wireless signal sensors), a camera, and a power source. The power source may be a source provided by the powered asset, an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each powered asset beacon 150 can store one or more unique identifiers, such as a global unique identifier (GUID), a universally unique identifier (UUID), a character string, an alphanumeric string, text string, and/or the like. The unique identifier may identify the associated powered asset 100 and/or powered asset beacon. Via various communication standards and protocols, the powered asset beacon 150 associated with the powered asset 100 can be communicated with, interrogated, read, and/or the like. For example, a container beacon 155 associated with a container 107 can communicate with the powered asset beacon 150 associated with the power asset 100 using multiple wireless communication standards and protocols, including Bluetooth, Wibree, NFC, Wi-Fi, ZigBee, and/or any other wireless protocol or standard. For example, the one or more powered asset beacons 150 may be configured to communicate with one or more container beacons 155 via one or more configurations as described in U.S. Pat. No. 9,658,310, the contents of which is incorporated herein by reference in its entirety. As a specific example, the one or more powered asset beacons 150 may collective define a communication area within the powered asset 100 in which the container beacon 155 may communicate with one or more of the powered asset beacons 150. Upon establishing a wireless communication connection with a threshold number of powered asset beacons 150 associated with a single powered asset 100, the container beacon 155 may be determined to be associated with the powered asset 100, as discussed in greater detail herein. The powered asset beacon 150 associated with the powered asset 100 may also be in direct or indirect communication with the tracking computing entity 110, the information/data collection device 130, mobile computing entity 105, and/or similar computing entities over the same or different wired or wireless networks.

As will be recognized, a powered asset beacon 150 can be used to sense and/or detect various information/data. For example, a powered asset beacon 150 can be capable of sensing temperature information/data, pressure information/data, altitude information/data, vacuum information/data, vibration information/data, shock information/data, humidity information/data, moisture information/data, light information/data, air information/data, heading information/data, battery level information/data, and/or the like. In one embodiment, a powered asset beacon 150 may be operated in one or more operating modes, such as advertising mode, listening mode, sleep mode, and/or the like. In advertising mode, the powered asset beacon 150 may transmit one or more advertising signals regularly, periodically (e.g., 10 times/second), and/or continuously. The one or more advertising signals may include one or more unique identifiers (e.g., powered asset information and/or unique powered asset beacon identifier), received signal strength indicator (RSSI), and/or other information/data. In listening mode, the powered asset beacon 150 is capable of receiving one or more signals transmitted by other beacons and/or other computing entities. In sleep mode, the powered asset beacon 150 may cut power to unneeded subsystems and place the other subsystems (e.g., receiver, processor) into a configurable low power state (e.g., with just sufficient power for the powered asset beacon 150 to detect triggers/events for it to change/switch from sleep mode into other operational modes (e.g., listening mode, advertising mode)). The change of the operational mode may be triggered by various configurable triggers/events, such as pressure, altitude, motion, location, light, sound, time, one or more signals transmitted from another beacon and/or an appropriate computing entity, a switch, a button, combinations thereof, and/or the like.

As noted, the powered asset beacon 150 may comprise a camera (e.g., a video camera, a still camera, and/or the like) configured for collecting visual data regarding an environment surrounding the powered asset beacon 150. The camera may have a fixed field of view (FOV) relative to the camera, comprising a defined angle within the FOV relative to the camera. For example, the FOV of the camera may comprise a 15 degree FOV (e.g., encompassing a cone having a 15 degree side-slope centered at a lens of the camera), a 30 degree FOV, a 10 degree FOV, and/or the like. Moreover, the FOV may extend a defined distance away from the camera (e.g., 10 feet, 20 feet, 30 feet, and/or the like). For example, the length of the FOV of the camera may correspond to the expected detection distance of the wireless signal receiver of the powered asset beacon 150.

Moreover, the camera may have a known orientation relative to the powered asset 100, such that the heading of the powered asset (and/or powered asset beacon 150) may be utilized to determine the location of the FOV of the camera relative to the heading of the powered asset 100. In certain embodiments, the camera orientation may be fixed relative to the powered asset 100, or the camera orientation may be movable relative to the powered asset 100. In the latter embodiments, the orientation of the camera may be tracked to monitor the orientation of the camera relative to the heading of the powered asset 100.

Figure 8:
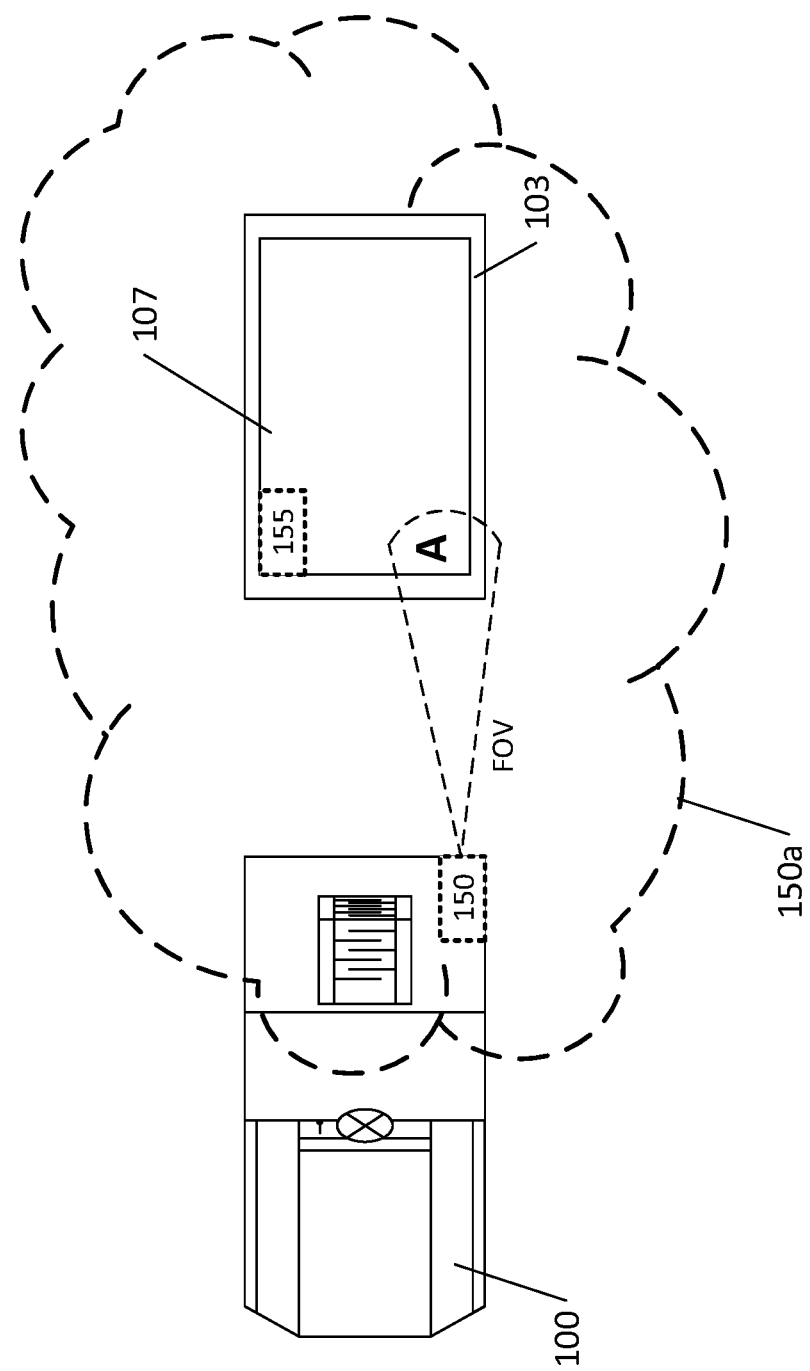
FIG. 8 is a schematic illustration of a powered asset beacon detecting a location of a container beacon in accordance with various embodiments of the present invention.

Thus, as discussed in greater detail herein, the detection of a container 107 (and/or other asset) within the FOV of the camera may be utilized to determine the location of the container 107 relative to the powered asset 100 based on the known orientation of the FOV of the camera relative to the heading of the powered asset 100. As a specific example, in an embodiment in which the FOV of the camera extends directly behind the powered asset 100 (as shown in FIG. 8), and the powered asset 100 is known to be pointing due north at a given location, the detection of a container 107 within the FOV of the camera may be utilized to determine that the container 107 is due south of the powered asset 100 by a distance less than or equal to the length of the FOV of the camera relative to the given location.

In certain embodiments, the camera and/or other aspects of the powered asset beacon 150 may be configured for performing optical character recognition (OCR) on one or more images collected by the camera. As discussed in greater detail herein, containers 107 may have identifying information (e.g., alphanumeric strings) printed or otherwise disposed on one or more sidewalls of the containers. The powered asset beacon 150 may thus be configured to recognize the identifying information on a container visible within the FOV of the camera (e.g., via OCR), and may utilize the recognized identifying information to augment and/or improve the accuracy of the wireless information/data to precisely and accurately identify the location of the container 107.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the powered asset 100 in which the information/data collection device 130 is installed, specific to the geographic area in which the powered asset 100 will be traveling, specific to the function the powered asset 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, NFC protocols, Wibree, Bluetooth protocols (including Bluetooth Low Energy (BLE)), wireless universal serial bus (USB) protocols, and/or any other wireless protocol.

b. Exemplary Non-Powered Assets

In various embodiments, a non-powered asset 103 may be any dolly, trailer, chassis, stacker truck, side loader, pallet truck, hand truck, handcart, roller deck, slave pallet, container trailer, pallet trailer, cargo trailer, cargo cart and/or the like. As will be recognized, a non-powered asset 103 may be configured to be pushed, pulled, lifted, or otherwise moved. The non-powered asset 103 may transport one or more one or more containers 107 storing one or more items 109 (which may be stored in containers 107). Further, each non-powered asset 103 may be associated with a unique non-powered asset identifier (such as a non-powered asset ID) that uniquely identifies the non-powered asset 103. The unique non-powered asset ID may include characters, such as numbers, letters, symbols, and/or the like. For example, an alphanumeric non-powered asset ID (e.g., "7221A445533AS449") may be associated with each non-powered asset 103.

In one embodiment, each non-powered asset 103 may be associated with one or more RFID tags/sensors, beacons, computing entities, and/or the like. In one embodiment, each non-powered asset 103 can be capable of sensing temperature information/data, pressure information/data, altitude information/data, vacuum information/data, vibration information/data, shock information/data, humidity information/data, moisture information/data, light information/data, air information/data, heading information/data, battery level information/data, and/or the like. Thus, each non-powered asset may be configured to collect information/data and communicate various information/data using multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

In certain embodiments, the non-powered assets 103 may comprise and/or be associated with one or more non-powered asset beacons (not shown) having a configuration analogous to the powered asset beacons 150 described herein. In such embodiments, the various container beacons 155 may be configured to selectably initiate wireless communication with the non-powered asset beacons in a manner described in reference to the wireless communication between the container beacons 155 and the powered asset beacons 150.

Moreover, the non-powered assets beacons may comprise one or more cameras having known orientations relative to the non-powered assets, as discussed in reference to the powered asset beacons 150, above. Accordingly, as discussed above, the non-powered asset beacons may be utilized to determine a directional location of one or more containers relative to the position of the non-powered asset 103.

c. Containers and/or Items

In one embodiment, a container 107 is configured to store and transport one or more items (e.g., shipments, packages, pallets, etc.) of varying shapes and sizes. For instance, in various embodiments, a container 107 may be a unit load device (ULD) used to store and transport items 109 on an aircraft. An item 109 may be any tangible and/or physical object. In one embodiment, an item may be or be enclosed in one or more packages, envelopes, parcels, bags, goods, products, loads, crates, items banded together, drums, the like, and/or similar words used herein interchangeably.

In one embodiment, each container 107 and/or item 109 may include and/or be associated with unique a tracking identifier, such as an alphanumeric identifier. Such tracking identifiers may be represented as text, barcodes, tags, character strings, Aztec Codes, MaxiCodes, information/data Matrices, Quick Response (QR) Codes, electronic representations, and/or the like. A unique tracking identifier (e.g., 1Z123456789) may be used by a carrier to identify and track containers 107 and items 109 as they move through a carrier's transportation network. For example, information/data comprising a tracking identifier can be read, scanned, transmitted, and/or the like to provide and/or identify/determine the location of a container 107 and/or item 109. As will be recognized, items 109 can be associated with a container 107 and therefore associated items 109 can considered to be located in the container 107 at the determined location of the container 107. These can be referred to as "logical" scans/determinations or "virtual" scans/determinations.

Such tracking identifiers can be affixed to items by, for example, using a sticker (e.g., label) with the unique tracking identifier printed thereon (in human and/or machine readable form). In other embodiments, a container beacon 155 or an RFID tag may be affixed to or associated with each container 107 and/or item 109 and store a unique tracking identifier. As previously noted, a beacon may take many forms. For example, a beacon may be a BLE beacon (e.g., a URIBeacon, an AltBeacon, or an iBeacon), an RFID tag/sensor, an NFC device, a Wi-Fi device, and/or the like. The container beacon 155 can include some or all of the following components: one or more input interfaces for receiving information/data, one or more output interfaces for transmitting information/data, a processor, a clock, memory modules, one or more sensors for sensing and detecting various information/data, and a power source. The power source may be an energy storage device (e.g., a battery, a supercapacitor, and/or the like), an energy harvesting device (e.g., a solar panel, a vibration energy harvester, a thermal energy harvester, a RF energy harvester, and/or the like), and/or the like. In one embodiment, each container beacon 155 can store one or more unique identifiers, such as a GUID, a UUID, a character string, an alphanumeric string, text string, and/or the like. The unique identifier may identify the associated container 107 (and/or item 109) and/or container beacon 155. Via various communication standards and protocols, the container beacon 155 associated with the container 107 and/or item 109 can be communicated with, interrogated, read, and/or the like. For example, the container beacon 155 associated with the container 107 and/or item 109 can communicate with a powered asset beacon 150 associated with a powered asset 100 using multiple wireless communication standards and protocols, including Bluetooth, Wibree, NFC, Wi-Fi, ZigBee, and/or any other wireless protocol or standard. The container beacon 155 associated with the container 107 and/or item 109 may also be in direct or indirect communication with a tracking computing entity 110, an information/data collection device 130, a mobile computing entity 105, and/or similar computing entities over the same or different wired or wireless networks.

As will be recognized, a container beacon 155 can be used to sense and detect various information/data. For example, a container beacon 155 can be capable of sensing temperature information/data, pressure information/data, altitude information/data, vacuum information/data, vibration information/data, shock information/data, humidity information/data, moisture information/data, light information/data, air information/data, heading/directional information/data, battery level information/data, and/or the like. In one embodiment, a container beacon 155 may be operated in one or more operating modes, such as advertising mode, listening mode, sleep mode, and/or the like. In advertising mode, the container beacon 155 may transmit one or more advertising signals regularly, periodically (e.g., 10 times/second), and/or continuously. The one or more advertising signals may include one or more unique identifiers (e.g., unique container identifier and/or unique container beacon identifier), RSSI, and/or other information/data. In listening mode, the container beacon 155 is capable of receiving one or more signals transmitted by other beacons, and/or an appropriate computing entities. In sleep mode, the container beacon 155 may cut power to unneeded subsystems and place the other subsystems (e.g., receiver, processor) into a configurable low power state (e.g., with just sufficient power for the container beacon 155 to detect triggers/events for it to change/switch from sleep mode into other operational modes (e.g., listening mode, advertising mode)). The change of the operational mode may be triggered by various configurable triggers/events, such as pressure, altitude, motion, light, location, sound, time, one or more signals transmitted from another beacon and/or an appropriate computing entity, a switch, a button, combinations thereof, and/or the like.

Although the following discussion focuses on the tracking and/or monitoring of the location of containers 107 specifically, it should be understood that concepts discussed herein may be utilized to track and/or monitor the location of any of a variety of assets, including, without limitation, containers 107 (as discussed directly herein), powered assets 100, nonpowered assets 103, employees (e.g., carrying a beacon), mobile computing entities, objects, and/or the like.

d. Exemplary Tracking Computing Entity

Figure 3:
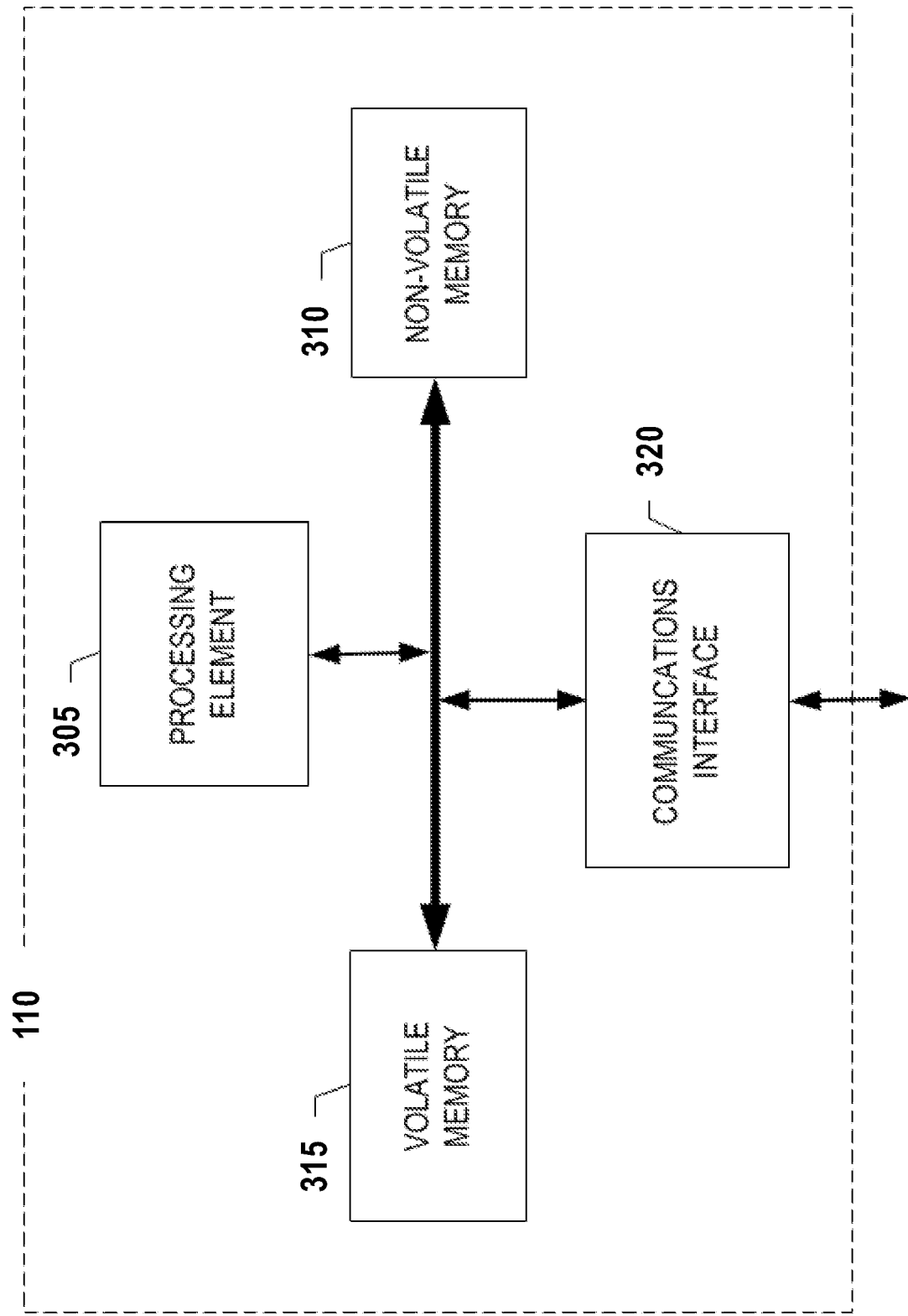
FIG. 3 is a schematic of a tracking computing entity in accordance with certain embodiments of the present invention.

FIG. 3 provides a schematic of a tracking computing entity 110 according to one embodiment of the present invention. The tracking computing entity can be operated by a variety of entities, including a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Coyote, Amazon, Google, Uber, ride-sharing services, crowd-sourcing services, retailers, and/or the like.

In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, beacons, key fobs, RFID tags, ear pieces, scanners, televisions, dongles, cameras, wristbands, wearable items/devices, items/devices, powered assets, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the tracking computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the tracking computing entity 110 may communicate with powered assets 100, mobile computing entities 105, and/or the like.

As shown in FIG. 3, in one embodiment, the tracking computing entity 110 may include or be in communication with one or more processing elements 305 (also referred to as processors, processing circuitry, and/or similar terms used herein interchangeably) that communicate with other elements within the tracking computing entity 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the tracking computing entity 110 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the tracking computing entity 110 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the tracking computing entity 110 with the assistance of the processing element 305 and operating system.

As indicated, in one embodiment, the tracking computing entity 110 may also include one or more communications interfaces 320 for communicating with various computing entities, such as by communicating data, content, information, and/or similar terms used herein interchangeably that can be transmitted, received, operated on, processed, displayed, stored, and/or the like. For instance, the tracking computing entity 110 may communicate with computing entities or communication interfaces of the powered asset 100, mobile computing entities 105, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the tracking computing entity 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the tracking computing entity 110 may include or be in communication with one or more input elements, such as a keyboard input, a mouse input, a touch screen/display input, audio input, pointing device input, joystick input, keypad input, and/or the like. The tracking computing entity 110 may also include or be in communication with one or more output elements (not shown), such as audio output, video output, screen/display output, motion output, movement output, and/or the like.

As will be appreciated, one or more of the tracking computing entity's 110 components may be located remotely from other tracking computing entity 110 components, such as in a distributed system. Furthermore, one or more of the components may be combined and additional components performing functions described herein may be included in the tracking computing entity 110. Thus, the tracking computing entity 110 can be adapted to accommodate a variety of needs and circumstances.

e. Exemplary Mobile Computing Entity

Figure 4:
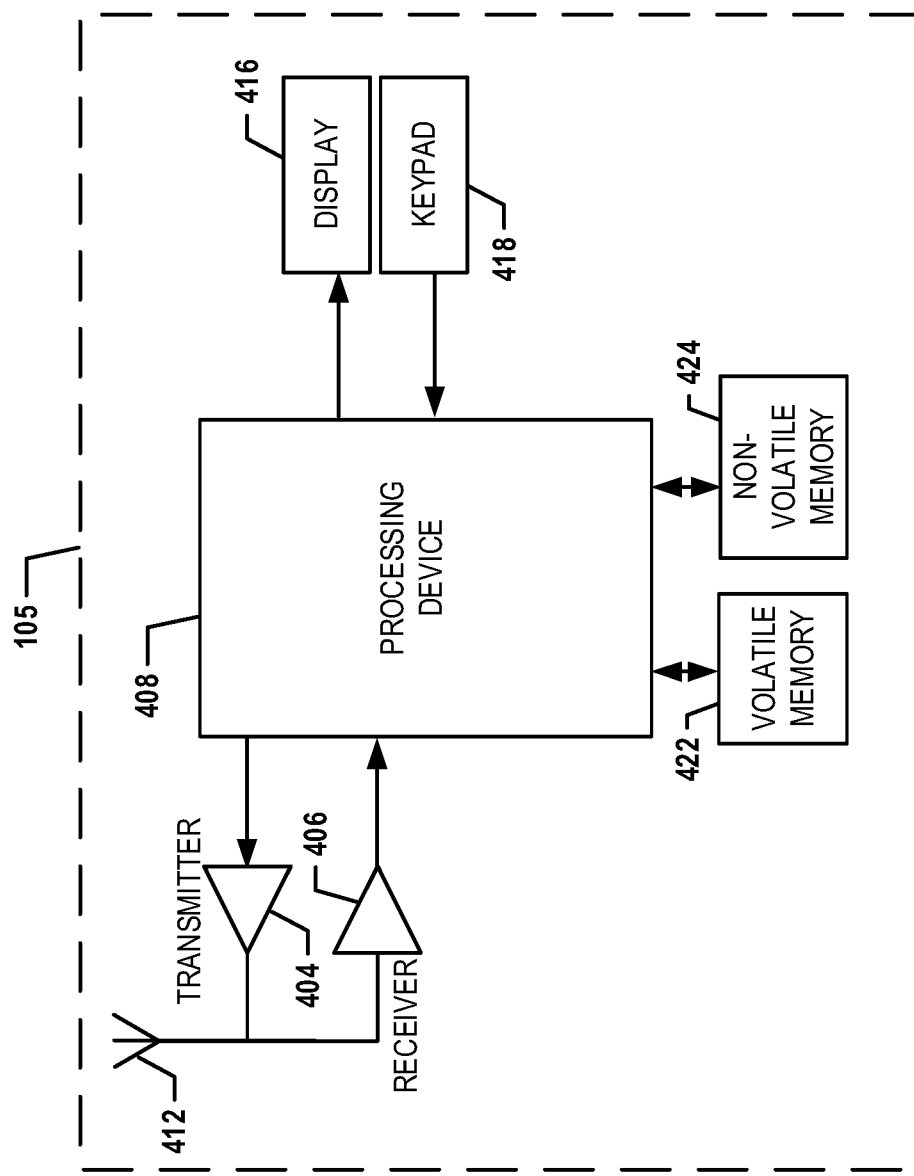
FIG. 4 is a schematic of a mobile computing entity in accordance with certain embodiments of the present invention.

FIG. 4 provides an illustrative schematic representative of a mobile computing entity 105 that can be used in conjunction with embodiments of the present invention. In one embodiment, a mobile computing entity may be carried for use by carrier personnel. In one embodiment, the mobile computing entities 105 may include one or more components that are functionally similar to those of the tracking computing entity 110 and/or as described below. As will be recognized, mobile computing entities 105 can be operated by various parties, including personnel loading, unloading, delivering, transporting containers 107 and/or items 109. As shown in FIG. 4, a mobile computing entity 105 can include an antenna 412, a transmitter 404 (e.g., radio), a receiver 406 (e.g., radio), and a processing element 408 that provides one or more signals to and receives one or more signals from the transmitter 404 and receiver 406, respectively.

The one or more signals provided to and received from the transmitter 404 and the receiver 406, respectively, may include signaling information/data in accordance with an air interface standard of applicable wireless systems to communicate with various entities, such as powered assets 100, tracking computing entities 110, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), and operating system.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, GLONASS, the Chinese Compass navigation systems, Indian Regional Navigational satellite systems, and/or the like. Additionally, the location module may be compatible with A-GPS for quick time to first fix and jump starting the ability of the location module to acquire location almanac and ephemeris data, and/or be compatible with SBAS such as WAAS, EGNOS, MSAS, and/or GAGN to increase GPS accuracy. Alternatively, the location information/data may be determined by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE receivers and/or transmitters, NFC receivers and/or transmitters, and/or the like. These indoor positioning aspects can be used in a variety of settings to determine the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the mobile computing entity 105.

d. Exemplary User Computing Entity

In one embodiment, the user computing entities 140 may each include one or more components that are functionally similar to those of the tracking computing entity 110 and/or the mobile computing entity 105. For example, in one embodiment, each of the user computing entities 140 may include: (1) a processing element that communicates with other elements via a system interface or bus; (2) a user interface; (3) transitory and non-transitory memory; and (4) a communications interface. As previously noted, the user computing entity 140 may comprise a user interface. For example, the user interface may be an application, browser, user interface, dashboard, webpage, and/or similar words used herein interchangeably executing on and/or accessible via the user computing entity 140 to interact with and/or cause display of information/data from the tracking computing entity 110 and/or the mobile computing entity 105, as described herein. These architectures are provided for exemplary purposes only and are not limiting to the various embodiments.

III. Exemplary System Operation

Figure 5:
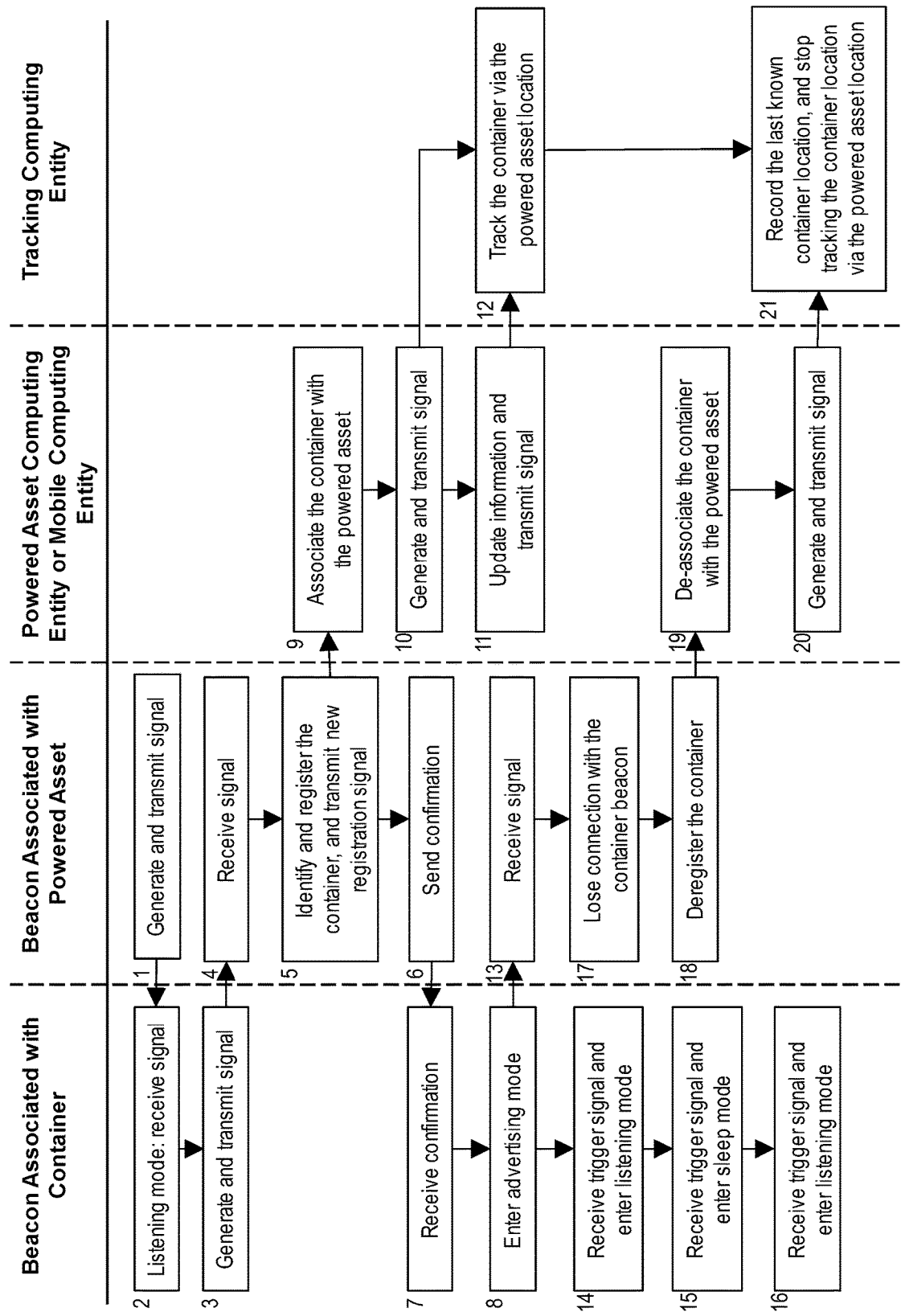
FIG. 5 is a flowchart illustrating operations and processes that can be used in accordance with various embodiments of the present invention.

Reference will now be made to FIG. 5. FIG. 5 is a flowchart illustrating operations and processes that can be used in accordance with various embodiments of the present invention.

Brief Overview

Described herein are embodiments for a flight-safe container (and/or other asset) tracking that allows tracking using beacons. In one embodiment, a container beacon 155 associated with a container 107 can support enablement of a flight-safe operational mode, which includes stopping the advertising operation of the container beacon 155 and keeping the container beacon 155 in the listening mode or the sleep mode as necessary (e.g., after being loaded onto a plane). After being unloaded from the plane, the container beacon 155 associated with the container 107 can receive one or more trigger signals to enable its advertising mode. The container beacon 155 can then transmit one or more signals to a powered asset beacon 150 associated with a powered asset 100, for example, to enable location tracking using Bluetooth Low Energy Beacons for the corresponding container 107.

In one embodiment, before the plane loaded with the container 107 starts to move, a flight-safe operational mode of the container beacon 155 associated with the container 107 may be enabled. The following operations/steps describe an exemplary enablement of a flight-safe operational mode. The enablement may be achieved by setting the listening mode as the default operational mode of the container beacon 155 associated with the container 107. Thus, for instance, after losing connection with a powered asset beacon 150 (or some other entity), the container beacon 155 may automatically stop the advertising mode and enter into the listening mode. Alternatively, the container beacon 155 can receive one or more trigger signals to stop the advertising mode and enable the listening mode or sleep mode. The one or more trigger signals can be transmitted from a device affixed to the plane, a device that is local to the corresponding plane location, or a device that is remotely located. The one or more trigger signals may be transmitted constantly, and/or periodically, such that the container beacons 155 may periodically or continuously receive the trigger signals to maintain the sleep mode of the container beacons 155 during flight.

In one embodiment, the container beacon 155 may switch/change modes from the listening mode to the power-saving sleep mode upon detecting the occurrence of one or more configurable triggers/events. The configurable triggers/events may be a value, a change, and/or a rate of change, of pressure, altitude, motion, light, combinations thereof, and/or the like; a location; a sound, a time; one or more sleep signals transmitted from another beacon (or other appropriate computing entity, such as a beacon secured within an aircraft); a switch; a button; and/or the like. The configurable triggers/events may be preconfigured, determined adaptively by the container beacon 155 associated with the container 107, transmitted from another beacon, and/or the like. For example, the container beacon 155 can enter into the sleep mode upon detecting that the altitude of the plane loaded with the container 107 has reached a configurable threshold, upon detecting that the container beacon 155 is inside or outside of one or more configurable geo-fences, upon detecting a unique sound signature (e.g., via a sound sensor) indicating the engaging of floor latch securing hardware, upon detecting the presence of a group of beacons exceeding a configurable threshold, upon detecting an elapsed period of time without receiving a signal, or after not having been moved for a configurable period of time. Alternatively, the container beacon 155 associated with the container 107 may switch/change from the listening mode to the sleep mode upon receiving one or more sleep trigger signals transmitted from an appropriate computing entity. For example, the container beacon 155 may enter a sleep mode for a fixed period of time upon receipt of a sleep trigger signal (e.g., a message) causing the container beacon 155 to enter the sleep mode. Accordingly, the container beacon 155 may periodically "wake-up" (switch from the sleep mode into an active mode) into a listening mode to determine whether the sleep trigger signals are still being broadcast. Upon determining that another sleep trigger signal is received, the container beacon 155 may reenter the sleep mode until such a time that the container beacon 155 wakes up and no sleep trigger signal is detected.

In one embodiment, the container beacon 155 may switch/change modes from the sleep mode to the listening mode upon detecting the occurrence of one or more configurable triggers/events. The configurable triggers/events may be a value, a change, and/or a rate of change, of pressure, altitude, motion, light, combinations thereof, and/or the like; a location, a sound, a time; one or more wake signals transmitted from another beacon (or other appropriate computing entity, such as a beacon secured within an aircraft); a switch; a button; and/or the like. As previously noted, the configurable triggers/events may be preconfigured, determined adaptively by the container beacon 155 associated with the container 107, transmitted from another beacon, and/or the like. For example, the container beacon 155 can enter into the listening mode upon detecting that the altitude of the plane loaded with the container 107 has reached a configurable threshold value, or determining a plane landing motion by detecting change of velocity, acceleration, altitude, combinations thereof, and/or the like. Alternatively, the container beacon 155 associated with the container 107 may switch/change from the sleep mode to the listening mode upon receiving one or more wake trigger signals transmitted from an appropriate computing entity.

In one embodiment, after being unloaded from the plane, the container beacon 155 may switch/change from the listening mode to the advertising mode upon detecting the occurrence of one or more configurable triggers/events. In another embodiment, the one or more wake trigger signals may be signals transmitted from a powered asset beacon 150 associated with a powered asset 100 (or any other computing entity, such as a device affixed to the plane).

In one embodiment, the container 107 is loaded to a non-powered asset 103 that is to be moved by a powered asset 100 (e.g., see FIG. 1). The container beacon 155 associated with the container 107 may receive one or more signals transmitted from a powered asset beacon 150 associated with the powered asset 100. The one or more signals transmitted by the powered asset beacon 150 may include a unique identifier (e.g., GUID, UUID, and/or the like). The container beacon 155 may, upon verifying that the received identifier is one that it should respond to, generate and transmit one or more signals, which may include the unique identifier, received signal strength indicator (RSSI), and/or other information/data. The powered asset beacon 150 may, upon receiving the one or more signals transmitted by the container beacon 155, identify and register the container 107 and transmit one or more confirmation signals. The container beacon 155 may then enter into the advertising mode.

In one embodiment, the powered asset beacon 150 (with which the container beacon 155 associated with the container 107 is registered) may transmit one or more signals to an appropriate computing entity (e.g., a mobile computing entity, a tracking computing entity) to associate the container 107 with the powered asset 100, and/or update the location of the container 107 as being the location of the powered asset 100 regularly, periodically, continuously, during certain time periods or time frames, upon determining the occurrence of one or more configurable triggers/events, in response to requests, in response to determinations/identifications, combinations thereof, and/or the like.

In one embodiment, the powered asset beacon 150 associated with the powered asset 100 may, upon detecting the connection/communication loss with the container beacon 155 associated with the container 107, deregister the container 107, and/or transmit one or more signals to the appropriate computing entity to de-associate the container 107 with the powered asset 100. The appropriate computing entity may record the last known container location and stop tracking the container 107 location via the powered asset's 100 location.

In one embodiment, the container beacon 155 associated with the container 107 may, upon detecting the connection/communication loss with the powered asset beacon 150 associated with the powered asset 100, switch/change to the listening mode. Alternatively, the container beacon 155 associated with the container 107 may maintain the advertising mode, upon detecting the connection/communication loss with the powered asset beacon 150 associated with the powered asset 100, until receiving one or more other trigger signals. As will be recognized, a variety of approaches and techniques can be used to adapt to various needs and circumstances.

Operation/Step 1 of FIG. 5: Generate and Transmit Signals

Figure 6:
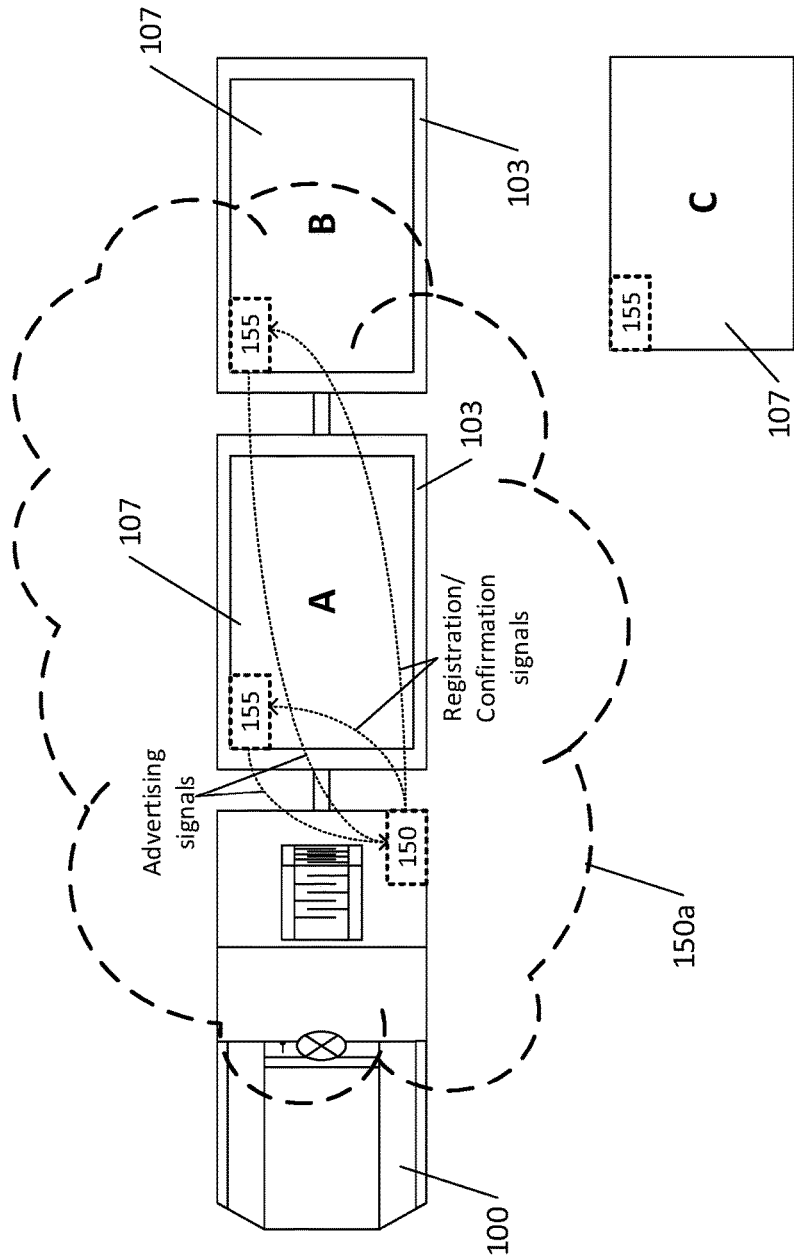
FIG. 6 is a schematic illustration of container beacons in communication with a powered asset beacon in accordance with various embodiments of the present invention.

In one embodiment, the process may begin with a powered asset beacon 150 associated with a powered asset 100 transmitting one or more signals for use by a container beacon 155 associated with a container 107. As shown in FIG. 6, which shows a schematic view of a powered asset 100 transporting a plurality of non-powered assets 103 and containers 107, the powered asset beacon 150 may transmit one or more signals (e.g., registration/confirmation signals, discussed in greater detail herein) within a communication range 150a to be received by various container beacons 155 located within the communication range 150a (e.g., container beacons associated with containers A and B). To avoid undesirably linking containers 107 that are not being transported by the powered asset 100 (e.g., container C, shown in FIG. 6), the communication range 150a may be configured to encompass an area around the powered asset 100 in which transported containers 107 are expected to be located (e.g., behind and/or on the powered asset). Certain embodiments may be configured to simply locate various containers however, regardless of whether those containers are connected to the powered asset 100. In such embodiments, the communication range 150a of a powered asset beacon may be generally circular surrounding the powered asset beacon 155, and may encompass areas beyond where a particular container 107 may be pulled and/or associated with the powered asset. The powered asset beacon 150 may transmit the one or more signals regularly, periodically, continuously, during certain time periods or time frames, on certain days, upon determining the occurrence of one or more configurable triggers/events, in response to requests, in response to determinations/identifications, combinations thereof, and/or the like. As previously noted, the one or more signals transmitted by the powered asset beacon 150 may include one or more unique identifiers. The unique identifiers may identify the relevance of the powered asset beacon 150 (and corresponding powered asset 100) to the container beacons 155 within range. For instance, the one or more signals may include a powered asset identifier and/or a powered asset beacon identifier (e.g., powered asset information/data).

As an alternative, the process may begin with an appropriate computing entity (e.g., an information/data collection device 130, a mobile computing entity 105, a powered asset computing entity, and/or the like) transmitting one or more signals for use by container beacons 155 within range. As yet another alternative, the process may begin with a device affixed to a plane, or a device that is local to the corresponding plane location, transmitting one or more signals for use by a container beacon 155 associated with a container 107 being unloaded from the plane. As will be recognized, a variety of other approaches and technique can be used to adapt to various needs and circumstances.

Operation/Step 2 of FIG. 5: Listening Mode: Receive Signals

In one embodiment, a container beacon 155 can have a preconfigured interest in powered asset beacon 150 signals of a particular class/type and/or appropriate computing entity signals of a particular class/type. The signals may include one or more unique identifiers that uniquely identify the corresponding powered asset 100 and/or powered asset beacon 150 (e.g., powered asset information/data). Using this approach, in listening mode, the container beacon 155 can ignore all powered asset beacon 150 signals and/or computing entity signals for which it is not registered. Similarly, the container beacon 155 can respond to a number of different types of powered asset beacon signals and/or computing entity signals.

Accordingly, as shown in FIG. 6, each of the container beacons 155 associated with containers A, B, and C may be in listening mode, until detecting the presence of a powered asset beacon 150 as discussed in greater detail herein. As an example, the container beacons 155 associated with containers A and B were in listening mode until receiving one or more signals from the powered asset beacon 150, and then the container beacons 155 associated with containers A and B entered advertising mode, as discussed herein. However, because the container beacon 155 associated with container C is not within a communication range of the powered asset beacon 150, the container beacon associated with container C remains in listening mode.

Operations/Steps 3 and 4 of FIG. 5: Generate, Transmit and Receive Signals

In one embodiment, after receiving one or more signals from a powered asset beacon 150 of a particular class/type (e.g., a powered asset beacon 150 for which the container beacon 155 has a preconfigured interest), the container beacon 155 may generate and transmit one or more signals for the powered asset beacon 150 to detect and process, as illustrated in FIG. 6. For example, the powered asset beacon 150 (or a plurality of powered asset beacons 150 associated with a single powered asset 100) may detect the presence of the container beacon 155 using one or more methodologies described in U.S. Pat. No. 9,658,310, which is incorporated herein by reference in its entirety. The one or more signals (e.g., advertising signals) from the container beacon 155 may include the powered asset's unique identifier, the powered asset beacon's unique identifier, the container's unique identifier, the container beacon's unique identifier, RSSI, and/or other information/data. Moreover, the powered asset beacon 150 may be configured to detect and monitor the strength of the received signal, and may be configured to compare the actual received signal strength against an expected signal strength as indicated by the RSSI data, and may utilize the determined difference between the actual and expected signal strength to estimate a distance between the powered asset beacon 150 and the container beacon 155. In one embodiment, the container's information/data (e.g., unique container identifier and/or unique container beacon identifier) may identify relevance of the container beacon 155 to the powered asset beacon 150 (and/or the appropriate computing entity). Thus, the powered asset beacon 150 may receive the one or more signals transmitted from the container beacon 155 with the container information/data.

In certain embodiments, the container's information/data as transmitted by the container beacon 155 may be detected by a plurality of powered asset beacons 150 (e.g., disposed on a respective plurality of powered assets 100). Each of the plurality of powered asset beacons 150 detecting the presence of the container beacon 155 may monitor various aspects of the received signal, such as the RSSI data, the detected signal strength, and/or the like to ascertain an estimated distance between the container beacon 155 and each powered asset beacon 150. Each powered asset beacon 150 (and/or another computing entity, such as the tracking computing entity 110) may compare the estimated distance between the powered asset beacons 150 and the container beacons 155 to triangulate the estimated location of the container 107, relative to the known locations of the powered assets 100 (e.g., as determined based at least in part on location sensors disposed on each powered asset 100).

Moreover, in embodiments in which the powered asset beacons 150 contain and/or are associated with cameras having known orientations relative to the powered asset beacons 150, the powered asset beacons may be configured to identify an estimated location of a detected container 107 that is visible within an FOV of the camera to augment and/or improve the accuracy of a determined location of a container 107 as determined based at least in part on the wireless information/data received from the container beacon 155. For example, the powered asset beacons 150 may be configured to ascertain an estimated distance between the powered asset beacons 150 and a detected container beacon 155 based at least in part on a comparison between the RSSI data and an actual detected signal strength. Moreover, upon detecting the container within an FOV of the camera (e.g., utilizing OCR to recognize container identifiers printed or otherwise disposed on a side of the container), the powered asset beacon 150 (and/or another computing entity, such as the tracking computing entity 110), may be configured to identify the location of the powered asset 100 and the orientation of the FOV of the camera disposed on the powered asset 100. Based on the known location of the powered asset 100 and orientation of the camera on the powered asset 100, the powered asset beacon 150 (and/or another computing entity, such as the tracking computing entity 110) may be configured to determine a relative orientation of the container 107 relative to the powered asset 100. Based at least in part on the known location of the powered asset 100, the known orientation of the camera, and the estimated distance between the powered asset beacon 150 and the container beacon 155, the powered asset beacon 150 (and/or another computing entity, such as the tracking computing entity 110) may be configured to determine an estimated location of the container 107. As a specific example with reference to FIG. 8 (which illustrates a schematic diagram of a located container 107 relative to a powered asset 100), the location of the container 107 may be estimated based on a known location of a single powered asset 100. The powered asset 100 may have a known location and heading, and the orientation of the FOV of the camera of the powered asset beacon 150 may be known to be directly opposite of the heading of the powered asset 100. In the embodiment of FIG. 8, the container beacon 155 may transmit container information/data to the powered asset beacon 150, including RSSI data. Based at least in part on the RSSI data and the detected signal strength received from the container beacon 155, the powered asset beacon 150 may estimate a distance between the powered asset beacon 150 and the container beacon 155. Moreover, because the container is located within the FOV of the camera of the powered asset beacon 150, the powered asset beacon 150 may be configured to identify the container based on the identifying information (indicated by the "A" on the container 107), and may determine an estimated location of the container 107 as being the estimated distance away from the powered asset beacon 150, and being located in the direction of the FOV of the camera of the powered asset beacon 150.

In certain embodiments, the wireless information/data collected by the powered asset beacon 150 (e.g., signals received from the container beacons 155) may be utilized to augment and/or improve the OCR process for recognizing information/data via the camera. For example, the wireless information/data may limit the possible data matches that may be utilized to ascertain the identity of identifying information viewable with the FOV of the camera. In certain embodiments, the powered asset beacon 150 may be configured to apply OCR concepts to determine that any viewable identifying information/data within the FOV of the camera must match identifying information of container 107 detected via wireless transmissions received by the powered asset beacon 150. As a specific example, the powered asset beacon 150 may detect wireless signals transmitted by container beacons 155 associated with containers 123ABC, 456DEF, and 789GHI. Therefore, upon identifying a container 107 within the FOV of the camera, the powered asset beacon 150 may be configured to compare the identifying information on the container 107 against each of character strings "123ABC," "456DEF," and "789GHI" to identify which of these character strings most closely resembles the identifying information/data on the container 107.

Moreover, in certain embodiments, the identifying information/data received via the camera of the powered asset beacon 150 (e.g., via OCR) may be utilized to augment and/or improve the information/data received wirelessly via the powered asset beacon 150 from the one or more container beacons 155. In certain embodiments, the powered asset beacon 150 may be configured to link or otherwise associate the powered asset 100 with a particular container 107 only if the container 107 is visible within the FOV of the camera. In such embodiments, if wireless information/data is detected from other container beacons 155, the powered asset beacon 150 may not associate with those other container beacons 155.

Operation/Step 5 of FIG. 5: Identify and Register the Container, and/or Transmit New Registration In one embodiment, after receiving the one or more signals in operation/step 4, the powered asset beacon 150 may register the container 107 using the container's information/data (e.g., unique container identifier and/or unique container beacon identifier) transmitted by the container beacon 155. In one embodiment, the powered asset beacon 150 (or other computing entity) may further transmit the one or more new container registration signals to an appropriate computing entity to initiate the process of associating the container 107 with the powered asset 100, such as to a tracking computing entity 105. The one or more transmitted registration signals may include the container information/data, the powered asset information/data, and/or the like. The communication between the powered asset beacon 150 and the appropriate computing entity may be executed using a wired connection, for example, a bus, a wired PAN, or the like, or via wireless communication networks, for example, a wireless PAN, LAN, MAN, WAN, and/or the like. As an alternative embodiment, the function of associating the container 107 with the powered asset 100 may be executed by the powered asset beacon 150.

Operations/Steps 6, 7, and 8 of FIG. 5: Send and Receive Confirmation, and Enter Advertising Mode In one embodiment, the powered asset beacon 150 (or other appropriate computing entity) may send one or more confirmation signals to the container beacon 155 to inform the container beacon 155 of a positive identification and registration of the corresponding container 107. Responsive to receiving the one or more confirmation signals, the container beacon 155 may enter advertising mode. In advertising mode, the container beacon 155 may regularly, periodically, and/or continuously transmit one or more advertising signals (as illustrated in FIG. 6) for use by the powered asset beacon 150 and/or the appropriate computing entity to track its location. To do so, the one or more advertising signals may include the container information/data (e.g., unique container identifier and/or unique container beacon identifier), RSSI, and/or other information/data.

In one embodiment, if the container beacon 155 associated with the container 107 determines/detects that it is no longer in communication with the powered asset beacon 150, the container beacon 155 may switch/change from the advertising mode to the listening mode. Similarly, if the container beacon 155 determines/detects that it is still in communication with the powered asset beacon 150, the container beacon 155 may continue advertising in advertising mode. In certain embodiments, the container beacon 155 may periodically enter listening mode for a brief period of time while in advertising mode to determine whether the container beacon 155 remains in connection with one or more powered asset beacons 150. For example, while in listening mode, the container beacon 155 may determine whether the container beacon 155 detects transmissions emitted by the powered asset beacon 150. Upon determining that the container beacon 150 detects transmissions emitted by the powered asset beacon 150, the container beacon 155 may reenter advertising mode to continue broadcasting container information/data to the powered asset beacon 150. However, upon determining that the container beacon 155 does not detect signals emitted by the powered asset beacon 150 while in listening mode, the container beacon 155 may remain in listening mode until a signal emitted from a powered asset beacon 150 is detected.

Operations/Steps 9, 10, 11, and 12 of FIG. 5: Associate and Track Container with Powered Asset In one embodiment, the mobile computing entity 105 (or other appropriate computing entity) may associate the container 107 with the powered asset 100 upon receiving the one or more container 107 registration signals from the powered asset beacon 150. In one embodiment, to track the container 107, the mobile computing entity 105 may generate and transmit one or more signals to the tracking computing entity 110 to initiate the process of tracking the container 107 and/or update the location of the container 107 as being the location of the corresponding powered asset 100. The one or more transmitted signals may include the powered asset information, container information/data of the newly registered container 107, a timestamp for initiating the association of the container 107 with the powered asset 100, and location information/data of the powered asset 100. The location information/data of the powered asset 100 (and thereby the container 107) may be identified/determined using GPS technologies by acquiring, for example, latitude, longitude, altitude, and/or geocode data corresponding to workers/users. Additionally or alternatively, the location information/data may be collected and provided via triangulation of various communication points (e.g., cellular towers, Wi-Fi access points, etc.) positioned at locations throughout a geographic area. Such embodiments allow the location and/or movement of powered assets 100 and associated containers 107 to be monitored and tracked. As will be recognized, a variety of other approaches and techniques can be used to adapt to various needs and circumstances. The location of each of these can be updated and stored in a tracking database, for example, by the tracking computing entity 110. The location of the powered assets 100 and containers 107 can be monitored, tracked, and updated regularly, periodically, continuously, upon determining the occurrence of one or more configurable triggers/events, and/or the like.

Operation/Step 13 of FIG. 5: Receive Signals

In one embodiment, the powered asset beacon 150 may receive one or more signals transmitted by a container beacon 155 in advertising mode to confirm that the container beacon 155 is within communication range and has normal connection with the powered asset beacon 150. This validates the continuing association of the container 107 with the powered asset 100, which indicates no action is needed to de-associate the container 107 with the powered asset 100. And as noted, the location of the powered assets 100 and containers 107 can be updated regularly, periodically, continuously, upon determining the occurrence of one or more configurable triggers/events, and/or the like. As will be recognized, these steps/operations can be performed by a variety of computing entities. The location of the containers 107 relative to the powered assets 100 may be determined and/or updated periodically based on the detected signal strength of the signal emitted by a container beacon 155 and received by a powered asset beacon 150 (e.g., compared against an emitted signal strength, as indicated in the RSSI data).

As discussed herein, the powered asset beacon 150 may continuously or periodically transmit one or more signals to the associated container beacons 155. As discussed below, the container beacons 155 may be configured to continuously and/or periodically monitor the connection with the powered asset beacon 150 (e.g., by periodically switching into listening mode), based at least in part on one or more detected signals transmitted from the powered asset beacon 150. Upon determining that no powered asset beacon 150 signals are detected, the container beacons 155 may be configured to switch from an advertising mode to a listening mode to conserve power. Thus, to ensure continued communication between the container beacons 155 and the powered asset beacons 150 (and vice versa), the powered asset beacons 150 may transmit one or more signals to be received by the associated container beacons 155.

In certain embodiments, the container beacons 155 may be wirelessly connected with a plurality of powered asset beacons 150 simultaneously. As the container beacons 155 broadcast container information/data while in advertising mode, a plurality of powered asset beacons 150 may receive the broadcast container information/data, and may monitor various aspects of the container beacon 155 based on the received container information/data. For example, each of a plurality of powered asset beacons 150 may receive the container information/data, and may determine a relative location of the powered asset beacon 150 relative to the container 107 (e.g., based on the received signal strength and/or the RSSI data broadcast by the container beacon 155). In certain embodiments, the location of each of the plurality of powered asset beacons 150 are known (e.g., based on location devices on each of the powered assets), and accordingly an estimated location of the container 107 may be determined by triangulation, utilizing the determined distances between the container 107 and each of the plurality of powered assets. For example, each of the plurality of powered asset beacons 150 may transmit container information/data including the determined distance between the container and the powered asset, to tracking computing entity, which may utilized the determined distances detected by a plurality of powered asset beacons 150 to triangulate the location of the container 107.

Operation/Step 14 of FIG. 5: Receive Trigger Signals and/or Enter Listening Mode In one embodiment, a container beacon 155 may switch/change to the listening mode from the advertising mode upon determining the occurrence of one or more configurable triggers/events. As previously described, the configurable triggers/events may be a value, a change, and/or a rate of change, of pressure, altitude, motion, light, combinations thereof, and/or the like; a location, a sound, a time; one or more signals transmitted from another beacon (or other appropriate computing entity; a switch; a button; and/or the like). The configurable triggers/events may be preconfigured, determined adaptively by the container beacon 155 associated with the container 107, transmitted from another beacon, and/or the like. For example, in one embodiment, the container beacon 155 may, while in the advertising mode, enable the listening mode during certain time periods or time frames to detect if the container beacon 155 is in normal communication with a powered asset beacon 150 associated with a powered asset 100 (and/or another appropriate computing entity). The container beacon 155 may switch/change into the listening mode, and stop advertising if necessary, upon detecting that the container beacon 155 is no longer in communication with the powered asset beacon 150 (and/or another appropriate computing entity). Alternatively, the container beacon 155 may switch/change into the listening mode and stop advertising upon receiving one or more trigger signals transmitted from a device (or other appropriate computing entity) affixed to a plane, local to the corresponding plane location, or remotely located.

Figure 7:
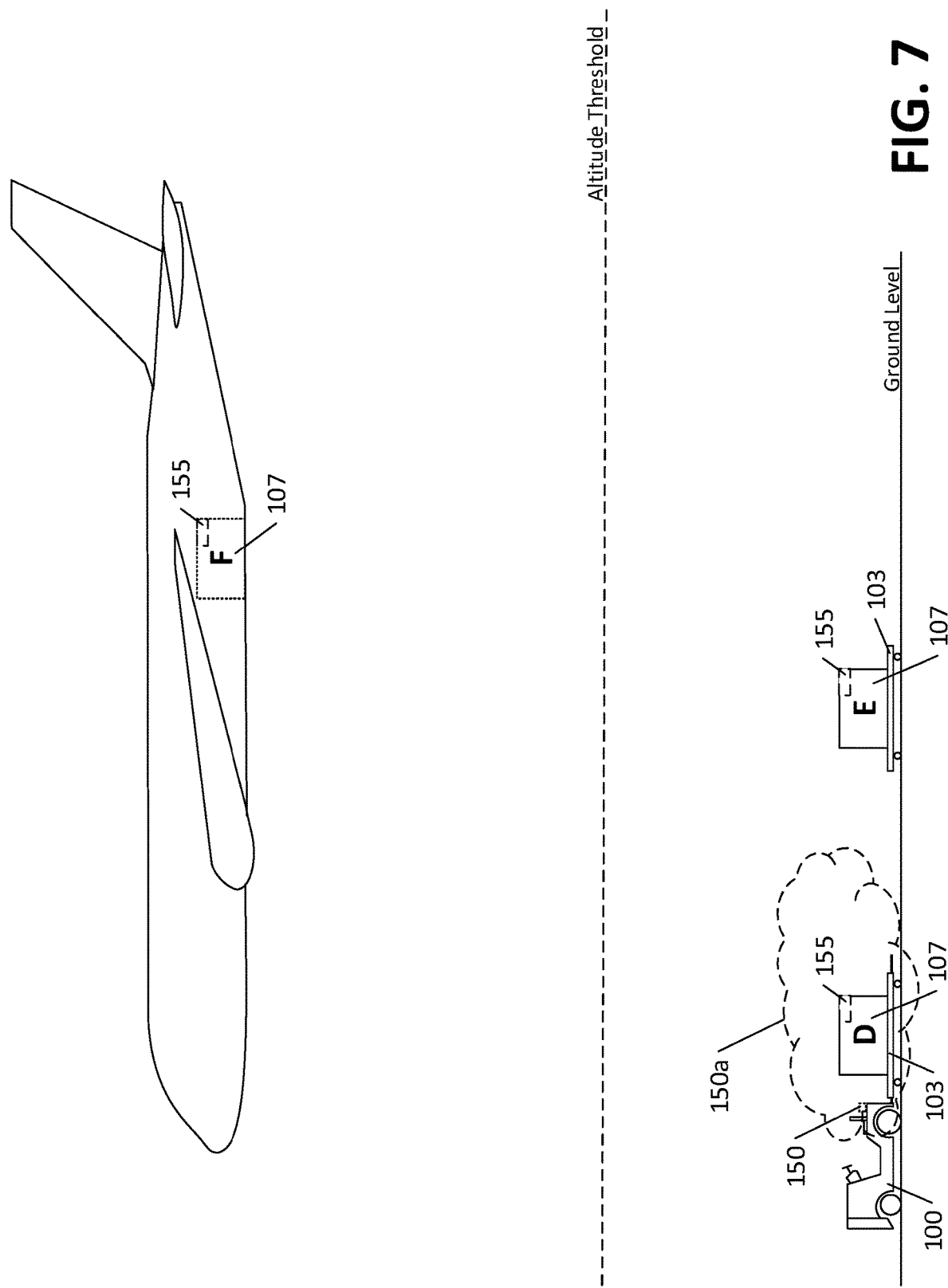
FIG. 7 is a schematic illustration of container beacons in various states of communication in accordance with various embodiments of the present invention.

Operations/Steps 15 and 16 of FIG. 5: Receive Trigger Signals and/or Change Mode In one embodiment, a container beacon 155 may switch/change from the listening mode to the sleep mode to save energy upon determining the occurrence of one or more configurable triggers/events. In an alternative embodiment, a container beacon 155 may switch/change directly from the advertising mode to the sleep mode to save energy upon determining the occurrence of one or more configurable triggers/events. For example, as shown in FIG. 7, the container beacon 155 may switch/change from the listening mode to the sleep mode upon detecting that a plane (in which the container 107 is loaded) has reached/exceeded a configurable altitude threshold and/or detecting a predefined motion event. In the illustrated embodiment of FIG. 7, the container beacons 155 associated with each of containers D and E remain below the altitude threshold, and therefore the container beacons 155 associated with containers D and E remain active. Specifically, the container beacon 155 associated with container D may be in advertising mode, because the container beacon 155 is located within the transmission range 150a associated with the powered asset beacon 150, and the container beacon 155 associated with container E is in listening mode. Container F shown in FIG. 7 is being transported by plane, and is located above the altitude threshold. Accordingly, the container beacon 155 associated with container F is in sleep mode and may remain in sleep mode until the container beacon 155 determines that it is located below the altitude threshold.

Alternatively, the container beacon 155 may enter into the sleep mode upon detecting that, for a configurable period of time, the container 107 has not been moved and/or the container beacon 155 has not been in communication with a powered asset beacon 150 for a configurable period of time. As will be recognized, a variety of other approaches and techniques can be used to adapt to various needs and circumstances.

As yet another example, the container beacon 155 may enter into the sleep mode upon receiving a trigger signal, for example, transmitted from a beacon located within an aircraft. The container beacon 155 may be configured to enter the sleep mode for a period of time upon detecting the trigger signal, and may be configured to awaken at the end of the period of time. Upon awakening, the container beacon 155 may monitor for one or more additional sleep mode trigger signals which, if received, cause the container beacon 155 to reenter the sleep mode for a period of time. In certain embodiments, the period of time may be predetermined (e.g., 1 minute, 15 minutes, 1 hour, and/or the like), or the period of time may be defined as a part of the data transmitted within the sleep mode trigger signal. For example, in the latter embodiment, the sleep mode trigger signal may comprise data identifying a period of time for the container beacon 155 to remain asleep (e.g., a period of time at least substantially equal to the expected length of a flight).

Similarly, the container beacon 155 may switch/change from the sleep mode to the listening mode upon determining the occurrence of one or more configurable triggers/events. For example, in one embodiment, the container beacon 155 may switch/change from the sleep mode to the listening mode upon detecting a plane, in which the container 107 is loaded, reaches a configurable altitude (e.g., ground level) and/or detecting a predefined motion event. Alternatively, the container beacon 155 may enter into the listening mode upon receiving one or more trigger signals transmitted from a device (or other appropriate computing entity) affixed to a plane, local to the corresponding plane location, or remotely located.

Operations/Steps 17 and 18 of FIG. 5: Lose Connection and Deregister Container

In one embodiment, a powered asset beacon 150 may detect the connection/communication loss with a container beacon 155 with which it is registered. In response, the powered asset beacon 150 (or other appropriate computing entity) may initiate the process to deregister the container 107 from the corresponding powered asset 100. Alternatively, a powered asset beacon 150 (or other appropriate computing entity) may generate and transmit one or more request signals to a registered container beacon 155 upon detecting the connection/communication loss with the container beacon 155. The one or more request signals may include triggers for the container beacon 155 to (a) switch/change to the advertising mode from the listening mode and/or the sleep mode and/or (b) request one or more advertising signals from the container beacon 155. If the powered asset beacon 150 (or other appropriate computing entity) does not receive a response from the container beacon 155 after one or multiple attempts to establish the connection, the powered asset beacon 150 (or other appropriate computing entity) may confirm the loss of connection with the container beacon 155 and/or initiate the process to deregister the container 107 accordingly.

After deregistering a container 107, the powered asset beacon 150 (or other appropriate computing entity) may transmit a request to de-associate the container 107 with the powered asset 100. In one embodiment, the request to de-associate the container 107 may include a timestamp with location information/data for the last normal communication between the container beacon 155 and the powered asset beacon 150 (or other appropriate computing entity).

Operations/Steps 19, 20, and 21 of FIG. 5: De-Associate the Container with the Powered Asset In one embodiment, responsive to an appropriate request, a container 107 may be de-associated with the powered asset 100 with which the container 107 was previously associated. In one embodiment, the de-association may include transmitting a request to tracking computing entity 110 to stop updating the container's 107 location as being the location of the previously associated powered asset 100. Correspondingly, the tracking computing entity 110 may record the last known container 107 location in the tracking database as being the location for the last normal communication between the container beacon 155 and the powered asset beacon 150 (or other appropriate computing entity). The appropriate computing entity records this location as the container 107 location until one or more new valid update signals are received for the container. For instance, the one or more new update signals may be requests to initiate location tracking of the container 107 via a powered asset 100 (or other appropriate computing entity), one or more signals informing that the container 107 is loaded onto a plane or moved into a warehouse, a scan or other reading of the container information/data at one or more points in the carrier's transportation and logistics network, and/or the like.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for monitoring a location of one or more assets, the system comprising:
one or more powered asset beacons coupled to an aircraft, each of the one or more powered asset beacons comprising an altitude sensor and configured to broadcast a sleep trigger instruction within a broadcast range when an altitude of the aircraft exceeds a predetermined threshold based on the altitude sensor;
a container beacon, the container beacon secured to a corresponding asset, and wherein the container beacon comprises:
one or more status sensors;
one or more wireless network interfaces configured to detect the sleep trigger instruction when the container beacon is located within the broadcast range of the one or more powered asset beacons; and
one or more processors configured to:
monitor the one or more status sensors and the one or more wireless network interfaces to determine an occurrence of one or more trigger states;
upon detecting that a trigger state is not present, configure the one or more wireless network interfaces into a listening mode, wherein the one or more wireless network interfaces are configured to receive wireless signals broadcast by third party computing entities while in the listening mode, and upon detecting that one or more wireless signals are received by the one or more wireless network interfaces, configuring the one or more wireless network interfaces into an advertising mode, wherein the one or more wireless network interfaces are configured to broadcast one or more signals while in the advertising mode that are used to provide a location of the corresponding asset coupled to the container beacon; and
determine, based on the one or more wireless network interfaces detecting the sleep trigger instruction, that a trigger state is present and configuring the one or more wireless network interfaces into a sleep mode, wherein the one or more wireless network interfaces are placed in a configurable power state and supplied with enough power to detect if the trigger state is no longer present and to change from the sleep mode to the listening mode.

2. The system of claim 1, wherein the one or more status sensors are additionally configured to monitor an altitude of the container beacon, and wherein the one or more processors are additionally configured to switch the one or more wireless network interfaces into the sleep mode when the one or more status sensors determines that the corresponding asset is above an altitude threshold.

3. The system of claim 1, wherein the one or more powered asset beacons are configured to at least periodically monitor for data broadcast from the container beacon, and wherein the one or more wireless network interfaces are configured to broadcast one or more signals to the one or more powered asset beacons while in the advertising mode.

4. The system of claim 3, further comprising a central computing entity, and wherein the one or more powered asset beacons are configured to at least periodically transmit data identifying the container beacon transmitting data to the one or more powered asset beacons.

5. The system of claim 3, wherein the one or more powered asset beacons comprise a plurality of powered asset beacons, and wherein each of the one or more powered asset beacons are configured to:
detect data broadcast from the container beacon;
determine, based at least in part on a signal strength of the detected data broadcast from the container beacon, a distance between a respective powered asset beacon and the container beacon;
transmit data identifying the distance between the respective powered asset beacon and the container beacon to a tracking computing entity and data identifying a location of the respective powered asset beacon; and
wherein the tracking computing entity is configured to triangulate a location of the container beacon based at least in part on the data received from each of the respective powered asset beacons.

6. The system of claim 1, wherein the one or more signals broadcast by the one or more wireless network interfaces comprises asset identifying data.

7. A method for monitoring a location of one or more assets, the method comprising:

providing a container beacon on each of the one or more assets, wherein the container beacon comprises one or more status sensors and one or more wireless network interfaces;

monitoring the one or more status sensors to determine an occurrence of one or more trigger states;

monitoring the one or more wireless network interfaces to determine if a trigger instruction has been received from one or more powered asset beacons within range of the one or more wireless network interfaces, wherein the one or more powered asset beacons is coupled to an aircraft and comprises an altitude sensor, the one or more powered asset beacons configured to broadcast a sleep trigger instruction within a broadcast range when an altitude of the aircraft exceeds a predetermined threshold based on the altitude sensor;

upon detecting that a trigger state is not present, configuring the one or more wireless network interfaces into a listening mode, wherein the one or more wireless network interfaces are configured to receive wireless signals broadcast by third party computing entities while in the listening mode, and upon detecting that the wireless signals broadcast by the third party computing entities are received by the one or more wireless network interfaces, configuring the one or more wireless network interfaces into an advertising mode, wherein the one or more wireless network interfaces are configured to broadcast one or more signals while in the advertising mode that are used to provide a location of each of the one or more assets coupled to the container beacon; and determine, based on the one or more wireless network interfaces detecting the sleep trigger instruction, that a trigger state is present and configuring the one or more wireless network interfaces into a sleep mode, wherein container beacon is placed in a configurable power state and supplied with enough power to detect when the trigger state is no longer present and to change from the sleep mode to the listening mode.

8. The method for monitoring the location of one or more assets of claim 7, wherein monitoring the one or more status sensors comprises monitoring an altitude of the container beacon, and detecting that a trigger state is present comprises detecting that the container beacon is located above a threshold altitude.

9. The method for monitoring the location of one or more assets of claim 7, further comprising:
broadcasting identifying data from the one or more powered asset beacons within a broadcast range; and
detecting, by the container beacon, the broadcast identifying data when the container beacon is located within the broadcast range of the one or more powered asset beacons.

10. The method for monitoring the location of one or more assets of claim 9, further comprising:
periodically monitoring, via the one or more powered asset beacons, for data broadcast from the container beacon; and
broadcasting, from the one or more wireless network interfaces, signals to the one or more powered asset beacons while the container beacon is in the advertising mode.

11. The method for monitoring the location of one or more assets of claim 10, further comprising:
transmitting, via the one or more powered asset beacons, data identifying the container beacon broadcasting data to the one or more powered asset beacons, to a central computing entity.

12. The method for monitoring the location of one or more assets of claim 11, further comprising:
associating data identifying the one or more assets corresponding to the container beacon with data identifying the one or more powered asset beacons; and
determining a location of the one or more assets to be a location of the one or more powered asset beacons.

13. The method for monitoring the location of one or more assets of claim 11, further comprising:
monitoring, via a plurality of powered asset beacons, for data broadcast from the container beacon;
determining, via each of the plurality of powered asset beacons, a signal strength of broadcast data from the container beacon;
determining a location of each of the plurality of powered asset beacons; and
triangulating, based at least in part on the data transmitted to the central computing entity, a location of the container beacon.

14. The method for monitoring the location of one or more assets of claim 7, wherein detecting a trigger state comprises detecting a trigger signal broadcast to the container beacon.

15. The method for monitoring the location of the one or more assets of claim 14, wherein the trigger signal is broadcast by the one or more powered asset beacons associated with the aircraft, and wherein the method further comprises:
transmitting a signal from the one or more powered asset beacons associated with the aircraft to a central computing entity;
associating data identifying the one or more assets associated with the container beacon with data identifying the aircraft; and
determining a location of the one or more assets to be a location of the aircraft.

* * * * *